O. M. RICE.
THEFT PREVENTING DEVICE FOR MOTOR VEHICLES.
APPLICATION FILED DEC. 17, 1920.

1,402,446. Patented Jan. 3, 1922.

Fig. 1ª.

INVENTOR.
Oscar M. Rice,
by Bakewell Byrnes Parmelee,
his Attys.

UNITED STATES PATENT OFFICE.

OSCAR M. RICE, OF BEAVER FALLS, PENNSYLVANIA.

THEFT-PREVENTING DEVICE FOR MOTOR VEHICLES.

1,402,446. Specification of Letters Patent. Patented Jan. 3, 1922.

Application filed December 17, 1920. Serial No. 431,441.

*To all whom it may concern:*

Be it known that I, OSCAR M. RICE, a citizen of the United States, residing at Beaver Falls, in the county of Beaver and State of Pennsylvania, have invented a new and useful Improvement in Theft-Preventing Devices for Motor Vehicles, of which the following is a full, clear, and exact description.

The present invention relates broadly to theft-preventing devices, and more particularly to a method of protection against theft adaptable to motor vehicles.

An important object of the present invention is to provide a motor vehicle with duplicate sets of data, one set normally covering the other and adapted to expose the same only upon an authorized removal thereof.

A further object of the invention is to provide a distinctive data carrying plate attached to a motor vehicle in a prominent position thereon, and carrying data corresponding to data made a permanent part of the motor vehicle and concealed by the plate as long as it remains in normal position.

A still further object of the invention is to provide a safety device of the character referred to for motor vehicles, positioned on the right hand side of the cowl or body of the vehicle, and constituting a protection in addition to license plates affixed to the vehicle in the customary manner.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the spirit of the invention.

Figure 1:
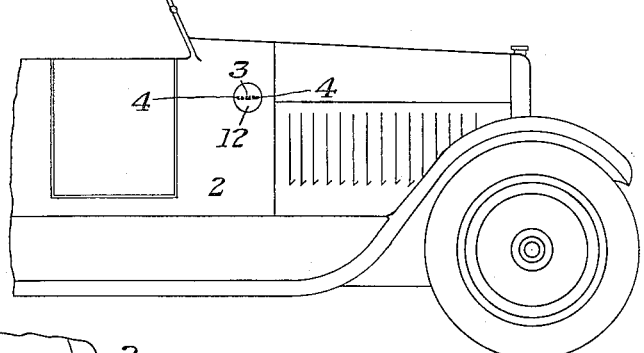
Figure 1:
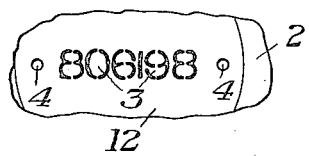
Figure 2:
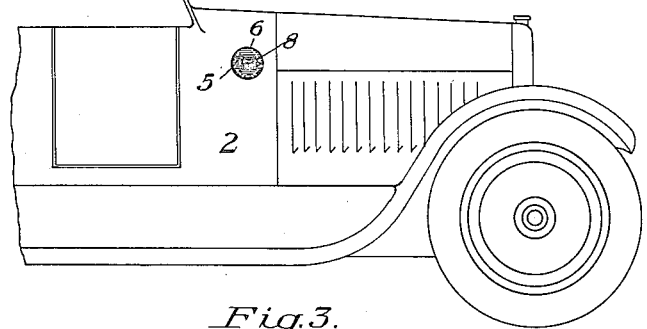
Figure 3:
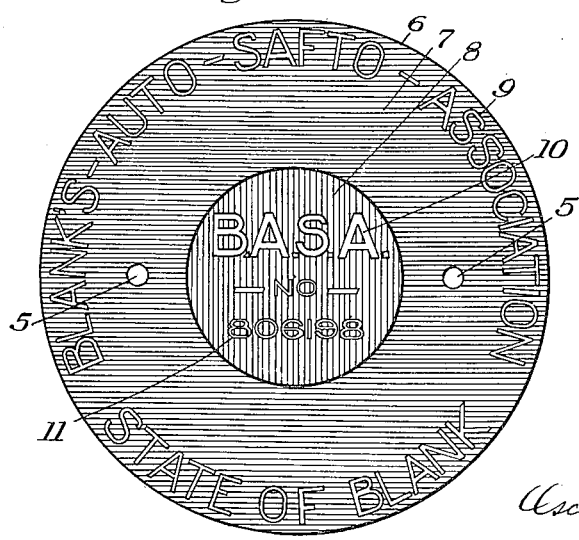

Figure 1 is a side elevation of the front portion of a vehicle;

Figure 1ª is a detail view of the permanent data on the vehicle;

Figure 2 is a view corresponding to Figure 1, illustrating the complete device in position on the vehicle; and Figure 3 is a detail view of the plate adapted to be secured in position to cover the permanent data on the vehicle.

I am aware that it has heretofore been proposed to provide a system for numbering motor cars by utilizing a removable plate carrying data corresponding to certain other data made a permanent part of the car. The objection to devices of this nature resides in the necessity of carrying about the removable plates when the driver leaves his car. The plates are not only cumbersome, but are likely to become lost, thereby making it difficult for the rightful owner of a car to drive the same. The present invention aims to overcome the objections inherent in a system of this type.

Referring more particularly to the drawings, there is illustrated a portion of a motor vehicle of any standard construction, having formed in the cowl, or front portion 2 of the body thereof, on the right hand side, permanent data comprising an identifying number 3. This number may be formed by cutting through the body of the car, by perforating the body, or in any other desired manner. Adjacent the opposite sides of the data 3, are openings 4 adapted to receive rivets passing through corresponding openings 5 in a plate 6 for securing the plate firmly in position on the vehicle above the data 3, whereby the data is normally concealed with the plate in position. According to the preferred embodiment of the invention, the plate 5 comprises a peripheral portion 7 having a blue background and a central portion 8 having a red background. This provides a distinctive plate capable of being seen at a distance and thereby attracting attention. The peripheral portion 7 of the plate may carry suitable descriptive matter or identifying matter 9 in contrasting colors. The central portion may also carry similar matter 10, in combination with identifying data 11 comprising a number corresponding to the number made a permanent part of the vehicle.

With a construction of the character described, it will be obvious that a person contemplating stealing a car will hesitate to steal one having a distinctive plate corresponding to the plate 6 thereon, as it affords a ready means of detection. If the plate 6 is removed, it will expose the permanent data 3 and permit the stolen car to be easily identified. Inasmuch as the data 3 is located in a prominent position on the vehicle, and is formed in a portion which is not readily removable, it will be obvious that obliteration of this identifying data will be difficult. Any attempt to conceal the data 3 by a temporary covering will immediately lead to suspicion and to justified apprehension of the driver of the vehicle.

Each driver of a vehicle protected in the manner disclosed herein may be provided with an owner's card carrying the usual data with relation to engine number, manufacturer's number, license number, safety protection number, and the like. In case of any doubt as to the ownership of a vehicle, the driver may be compelled to show his card upon demand, and in case of theft the card will enable the stolen vehicle to be readily identified.

In order to render the data 3 more conspicuous either by day or night when the plate 6 has been removed, there may be a background 12 of light colored, and preferably luminous paint provided around the data 3. This background is of slightly less area than the area of the plate 6, whereby it is normally concealed with the plate in position.

A direct benefit arising from a protecting device of the character described may be traced to the hesitancy on the part of any unscrupulous person to take a car having visible means of identification, due to fear of immediate detection.

The advantages of the present invention arise from the method of protecting vehicles by the attachment thereto of attractive and distinctly colored plates normally covering permanent data on the vehicle. Further advantages arise from the provision of such a plate in addition to the usual license plates required by law.

I claim:

1. A system of identifying and numbering motor vehicles which consists in placing on the vehicle permanent identifying data to form a record thereon, and in providing similar data on a plate securely attached to the vehicle to prevent easy removal and to cover said first mentioned data and adapted to expose said first mentioned data only when removed therefrom, substantially as described.

2. A system of identifying and numbering motor vehicles which consists in placing on the vehicle permanent identifying data to form a record thereon, and in providing similar data on a distinctively colored plate securely attached to the vehicle to prevent easy removal and to entirely cover said first mentioned data and adapted to expose the same upon unauthorized removal of the plate, substantially as described.

3. The combination with a motor vehicle, of identifying data permanently formed thereon to provide a permanent record, a distinctive back ground for said data, and a plate securely attached to said vehicle to prevent easy removal thereof and covering said first mentioned data, said plate being adapted to expose said data only upon unauthorized removal of the plate and having data thereon corresponding to said first mentioned data, substantially as described.

4. The combination with a motor vehicle, of identifying data permanently formed thereon to provide a permanent record, a luminous back ground for said data and a plate securely attached to said vehicle to prevent easy removal thereof and covering said first mentioned data, said plate being adapted to expose said data only upon unauthorized removal of the plate, and having data thereon corresponding to said first mentioned data, substantially as described.

In testimony whereof I have hereunto set my hand.

OSCAR M. RICE.